US010845779B2

(12) United States Patent
Panciatici

(10) Patent No.: US 10,845,779 B2
(45) Date of Patent: Nov. 24, 2020

(54) DESIGNING AN OUTER SURFACE OF A COMPOSITE PART

(71) Applicant: DASSAULT SYSTEMES, Velizy Villacoublay (FR)

(72) Inventor: Jeannine Panciatici, Carry le Rouet (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 16/550,854

(22) Filed: Aug. 26, 2019

(65) Prior Publication Data

US 2020/0012260 A1 Jan. 9, 2020

Related U.S. Application Data

(63) Continuation of application No. 15/386,681, filed on Dec. 21, 2016, now Pat. No. 10,437,231.

(30) Foreign Application Priority Data

Dec. 22, 2015 (EP) .................................... 15307098

(51) Int. Cl.
*G05B 19/4097* (2006.01)
*G06F 30/17* (2020.01)
(Continued)

(52) U.S. Cl.
CPC ...... *G05B 19/4097* (2013.01); *B29C 33/3835* (2013.01); *B29C 33/3842* (2013.01);
(Continued)

(58) Field of Classification Search
CPC ...... G05B 19/4097; G05B 2219/35012; G05B 2219/35261; G06F 30/17; G06F 30/20;
(Continued)

(56) References Cited

U.S. PATENT DOCUMENTS 5,251,290 A 10/1993 Pabon
7,010,472 B1 * 3/2006 Vasey-Glandon ...... G06F 30/00
703/6
(Continued)

FOREIGN PATENT DOCUMENTS

EP 1 710 720 B1 7/2009
EP 2 028 623 B1 10/2011
EP 2 838 041 A1 2/2015

OTHER PUBLICATIONS

Extended European Search Report dated Jun. 24, 2016 in Patent Application No. 15307098.2.
(Continued)

*Primary Examiner* — Ziaul Karim
(74) *Attorney, Agent, or Firm* — Oblon, McClelland, Maier & Neustadt, L.L.P.

(57) ABSTRACT

The disclosure notably relates to a computer-implemented method for designing an outer surface of a composite part manufactured by molding a stack of material layers. The method includes defining constant offset surfaces, a constant offset surface being a respective part of the outer surface which is to have a constant offset value relative to the reference surface, the constant offset value of a respective constant offset surface corresponding to the sum of the thicknesses of the material layers below the respective constant offset surface, and determining a final surface that corresponds to a tangent continuous connection of the constant offset surfaces. This provides an improved solution for designing an outer surface of a composite part.

9 Claims, 11 Drawing Sheets

(51) Int. Cl.
*G06F 30/20* (2020.01)
*B29C 33/38* (2006.01)
*B29C 70/48* (2006.01)
*G06F 113/26* (2020.01)
*G06F 119/18* (2020.01)

(52) U.S. Cl.
CPC .............. *B29C 70/48* (2013.01); *G06F 30/17* (2020.01); *G06F 30/20* (2020.01); *G05B 2219/35012* (2013.01); *G05B 2219/35261* (2013.01); *G06F 2113/26* (2020.01); *G06F 2119/18* (2020.01); *Y02P 90/02* (2015.11)

(58) Field of Classification Search
CPC .. G06F 2113/26; G06F 2119/18; G06F 30/23; G06F 30/15; G06F 30/13; B29C 33/3835; B29C 33/3842; B29C 70/48; Y02P 90/02
See application file for complete search history.

(56) References Cited

U.S. PATENT DOCUMENTS

| | | | |
|---|---|---|---|
| 7,809,531 B2 | 10/2010 | Murrish | |
| 2008/0312764 A1* | 12/2008 | Murrish | G06F 30/00 700/98 |
| 2010/0204815 A1* | 8/2010 | Murrish | G05B 19/4097 700/98 |
| 2013/0103359 A1* | 4/2013 | Grandine | G06F 30/15 703/1 |
| 2015/0106062 A1 | 4/2015 | Chen-Keat et al. | |

OTHER PUBLICATIONS

"Simulating moulding of complex composite parts", REINFORCEDplastics, 2000, p. 25.
Martin Held, "ERIT—A Collection of Efficient and Reliable Intersection Tests", Journal of Graphics Tools, vol. 2, No. 4, 1997, 16 Pages.
D.A. Dunavant, "High Degree Efficient Symmetrical Gaussian Quadrature Rules for the Triangle", International journal for numerical methods in engineering, vol. 21, 1985, pp. 1129-1148.
R. Herbin, "Eléments finis de Lagrange", Université Aix-Marseille 1, 2012, pp. 136-178.
Ulrich Pinkall, et al., "Computing Discrete Minimal Surfaces and Their Conjugates", Techn. Univ. Berlin and Math. Inst. Univ. Bonn, 1993, pp. 1-28.
ZhouPing Yin, et al., "Virtual prototyping of mold design: geometric mouldability analysis for near-net-shape manufactured parts by feature recognition and geometric reasoning", Computer-Aided Design, vol. 33, 2001, pp. 137-154.
N. L. Carothers, "A Short Course on Approximation Theory", Department of Mathematics and Statistics Bowling Green State University, 159 Pages.
Yan-Tao Li, "A constructive approach to solving 3-D geometric constraint systems using dependence analysis", Computer-Aided Design, vol. 34, 2002, pp. 97-108.
Leslie A Piegl, et al., "Tessellating trimmed NURBS surfaces", Computer-Aided Design, vol. 27, Issue 1, 1995, Abstract, 2 pages.
Suong V. Hoa, "Principles of the Manufacturing of Composite Materials" DEStech Publications, Inc., 2009, 352 Pages.
Eric W Weisstein, "Convolution", Wolfram MathWorld, accessed 2016.
Philip J. Davis, "Interpolation and Approximation", Dover Publications, Inc., 1975.

* cited by examiner

DESIGNING AN OUTER SURFACE OF A COMPOSITE PART

CROSS-REFERENCE TO RELATED APPLICATIONS

This application is a continuation application of, and claims the benefit of priority under 35 U.S.C. § 120 from, U.S. application Ser. No. 15/386,681, filed Dec. 21, 2016, which claims the benefit of priority under 35 U.S.C. § 119 or 365 to European Application No. 15307098.2, filed Dec. 22, 2015. The entire contents of the above application(s) are incorporated herein by reference.

FIELD OF THE INVENTION

The invention relates to the field of computer programs and systems, and more specifically to a method, system and program for designing an outer surface of a composite part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context, some solutions allow the design of composite parts, as these are mechanical parts more and more at use in many industries. However, existing solutions are not fully satisfactory. Notably, some solutions provide an approximate representation of the composite part, but not accurate enough for the manufacturing end to use it as such, or even for simulations performed on such a representation to be relevant enough. Other solutions provide general tools for local designs, that can be theoretically used for composite material design as well. Such solutions can be used to repair non-accurate designs of composite parts, or even design such composite parts from scratch, but they require many user interventions and are thus too inefficient from the point of view of ergonomics.

Within this context, there is still a need for an improved solution for designing an outer surface of a composite part.

SUMMARY OF THE INVENTION

It is therefore provided a computer-implemented method for designing an outer surface of a composite part manufactured by molding a stack of material layers. Each material layer has a respective thickness and a respective ply boundary. The method comprises providing a reference surface and a ply map that represents the stack of material layers between the reference surface and the outer surface. The ply map is defined as a list of contours. The contours are defined on the reference surface. Each contour is associated to the ply boundary of a respective material layer. The method also comprises defining constant offset surfaces. A constant offset surface is a respective part of the outer surface which is to have a constant offset value relative to the reference surface. The constant offset value of a respective constant offset surface corresponds to the sum of the thicknesses of the material layers below the respective constant offset surface. And the method comprises determining a final surface that corresponds to a tangent continuous connection of the constant offset surfaces.

Because the final surface corresponds to a tangent continuous connection of such specific constant offset surfaces, the final surface represents the composite part realistically and/or with relatively high accuracy, and the method thereby provides useful specifications for later relevant simulation(s) and/or production(s), such as the production of a mold for the manufacturing of the composite part. Thanks to it being simple and highly automatable, the method provides relatively high ergonomics to the user.

The method may comprise one or more of the following:

- the constant offset surfaces each have a respective boundary line parallel to the ply boundary of a respective material layer, the distance between the boundary line of a respective constant offset surface and the ply boundary of the respective material layer being larger than or substantially equal to a step width between the respective constant offset surface and the next and lower constant offset surface;
- each transition surface corresponds to a convolution product between a function $f^*$ defining a continuous connection of the constant offset surfaces that interpolates the ply boundaries and a convolution kernel $\phi$ defined for $x \in \mathbb{R}^3$ and of the type $\phi(x)=0$ if $\|x\|>w$, where $\|x\|$ is the Euclidean norm of x and $w>0$ is the convolution radius;
- the convolution kernel is of the type $$\phi(x) = \frac{1}{k}(w^2 - \|x\|^2)^3$$

if $\|x\| \le w$, where $k = \int_{\{\|x\|<w\}} (w^2-\|x\|^2)^3 dx$;
function $f^*$ is defined over a mesh fitting the reference surface and having faces, $f^*$ being affine over each face of the mesh, the contours of the ply map being formed by respective connected edges of the mesh, the respective edges being mapped in bijection by $f^*$ onto the ply boundaries;
- other respective connected edges of the mesh are mapped in bijection by $f^*$ onto the boundary lines of the constant offset surfaces;

other respective connected edges of the mesh are mapped in bijection by $f^*$ onto junction lines, a junction line joining the respective boundary lines of two consecutive constant offset surfaces; and/or function $f^*$ corresponds to a minimum of an energy that penalizes the image of $f^*$ over each face of the mesh deviating from a constant value.

It is further provided an outer surface of a composite part manufactured by molding a stack of material layers, each material layer having a respective thickness and a respective ply boundary, the outer surface being obtainable according to the method.

It is further provided a process for producing a mold adapted for the manufacturing of a composite part by molding a stack of material layers, each material layer having a respective thickness and a respective ply boundary, the process comprising receiving specifications of the outer surface and manufacturing a mold that physically corresponds to the received outer surface.

It is further provided a computer program comprising instructions for performing the method.

It is further provided a computer readable storage medium having recorded thereon the computer program and/or the outer surface.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
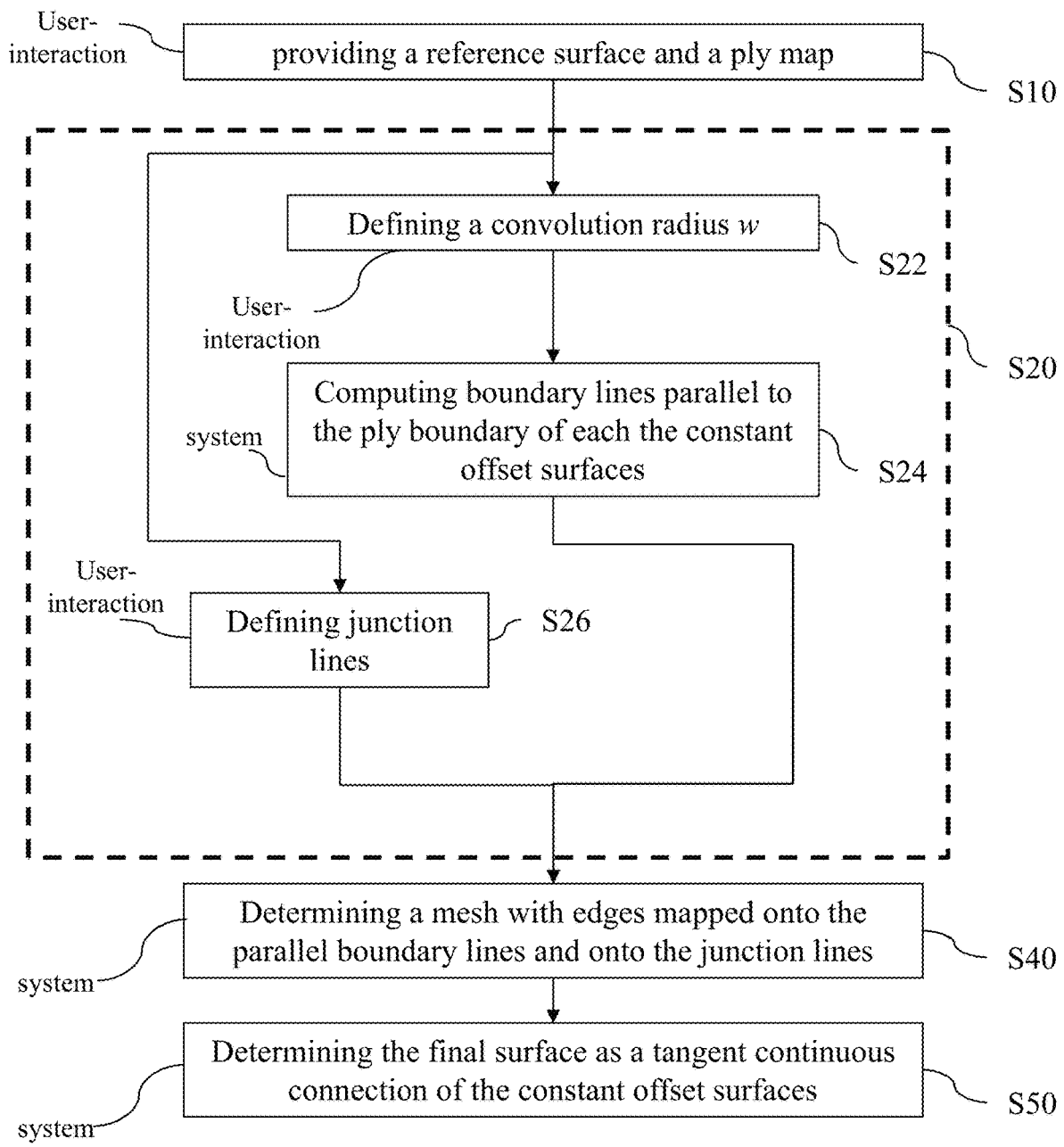
FIG. 1 shows a flowchart of an example of the method.

With reference to the flowchart of FIG. 1 which shows an example, it is proposed a computer-implemented method for designing an outer surface of a composite part.

As known per se, a composite part may be traditionally manufactured through a Resin Transfer Molding process (RTM in the following) or the like, e.g. by molding a stack of material layers (i.e. layers of material(s) piled up one over the other, stacked in a mold having a respective stacking direction, e.g. a direction representative of the integral of the local pressures, e.g. considered indifferently before or after the molding—which can be referred to as the local stacking direction—exerted by the mold on the stack of material layers, and then molded together), e.g. each layer being made of a same material or a combination of different materials, e.g. different layers being made either of a same material or same combination of materials, or either different materials or different combinations of materials). The molding material can be any adapted material, such as resin, e.g. which is injected/casted e.g. under liquid form, e.g. with a high temperature, and then e.g. cured/hardened. Each material layer has a respective thickness and a respective ply boundary. The thickness is a value representative of the height of the layer with respect to the stacking direction. The thickness may be, for each layer, and independently from the other layers, constant or variable (the following discussions being illustrative of the constant case, adaptation to the variable case being contemplatable by the skilled person). The ply boundary is the upper horizontal edge of the layer (with respect to the stacking direction), before the molding. Generally, the ply boundary is the edge of the layer in contact with the mold during the molding, and it is—e.g. slightly—flattened upon the stacking, due to the pressure, before the molding (thanks to the material layers being—e.g. slightly—deformable). In examples of the method, this flattening is captured by dedicated specifications. In case materials allowing no deformation are at use, such specific examples of the method may simply be adapted by accordingly adding corresponding quantities to the relevant parameters.

Now, the method is for designing a computer-implemented representation of an outer surface of such a composite part. The outer surface is at least a part of the envelope of the composite part (as resulting from the molding), possibly forming the whole envelope of the part together with the reference surface or with a symmetrically designed other outer surface. For example, the outer surface designed by the method of FIG. 1 is the upper surface of the composite part, with respect to the stacking direction. But it can alternatively be the lower surface, depending on the convention retained for the direction, being noted that the composite part can also be made of a stacking in both directions (the following discussions being illustrative of the unique stacking direction case). Now, by construction, such an outer surface of the composite part corresponds, in terms of geometry, to the inner surface of the upper matrix of a mold adapted for the manufacturing of the composite part (the inner surface of the lower matrix of the mold corresponding to the reference surface mentioned hereunder or to another outer surface—the discussions herein applying symmetrically in such a case—in case the stacking is performed in two directions).

Thus, the outer surface designed by the method can be used to produce a mold adapted for the manufacturing of the composite part whose outer surface was designed. For example, a designer may design the outer surface according to the method, and then the designer or another person (possibly the mold producer) may fix specifications thereof (e.g. by storing specifications of the outer surface on persistent memory, and/or by adding other specifications), thereby handling a modeled surface having a specific structure (i.e. specific geometry provided by the tangent continuity and/or specific topology, provided by the surface connections and yet in examples by the underlying meshing, discussed later). Then another user (e.g. the so-called "mold producer") and/or a computer may receive said specifications and manufacture (with adapted machinery) a mold based on such specifications. Notably, at least a portion of the mold (e.g. upper matrix, notably corresponding inner surface) physically corresponds to the received outer surface (i.e. the specifications are followed directly—thus optimizing the mold production time—and translated into material that forms said part of the mold, the final physical geometry corresponding to the virtual geometry designed by the method). As understood by the skilled person, the end user (i.e. the mold producer) possesses tools including software that are adapted for reading the format of the received outer surface specifications and manufacturing the mold. Once the mold is obtained, the composite part can in turn be manufactured (as explained above), industrially, for example in series.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined. For instance, the providing S10 and/or the defining S20 may be performed via user-interaction (e.g. the providing S10 amounting to a step-by-step design, e.g. from scratch, or to the retrieval from persistent memory of earlier-defined specifications by launching a dedicated functionality). The determining S50 (and/or S40) may be performed fully automatically (e.g. by a direct implementation/computation of the mathematics explained later), so as to decrease the burden put on the user and improve ergonomics.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a composite part or a mold adapted for manufacturing thereof. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, i.e. a composite part or a mold adapted for the manufacturing thereof. A CAD software solution allows the design of products in various and unlimited industrial fields, including: aerospace, architecture, construction, consumer goods, high-tech devices, industrial equipment, transportation, marine, and/or offshore oil/gas production or transportation. The composite part designed by the method may thus represent an industrial product which may be any composite part, such as a composite part of a terrestrial vehicle (including e.g. car and light truck equipment, racing cars, motorcycles, truck and motor equipment, trucks and buses, trains equipment), a composite part of an aerial vehicle (including e.g. airframe equipment, aerospace equipment, propulsion equipment, defense products, airline equipment, space equipment), a composite part of a naval vehicle (including e.g. navy equipment, commercial ships, offshore equipment, yachts and workboats, marine equipment), or a composite part of an architectural product (e.g. house, building structural equipment).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled object into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 2:
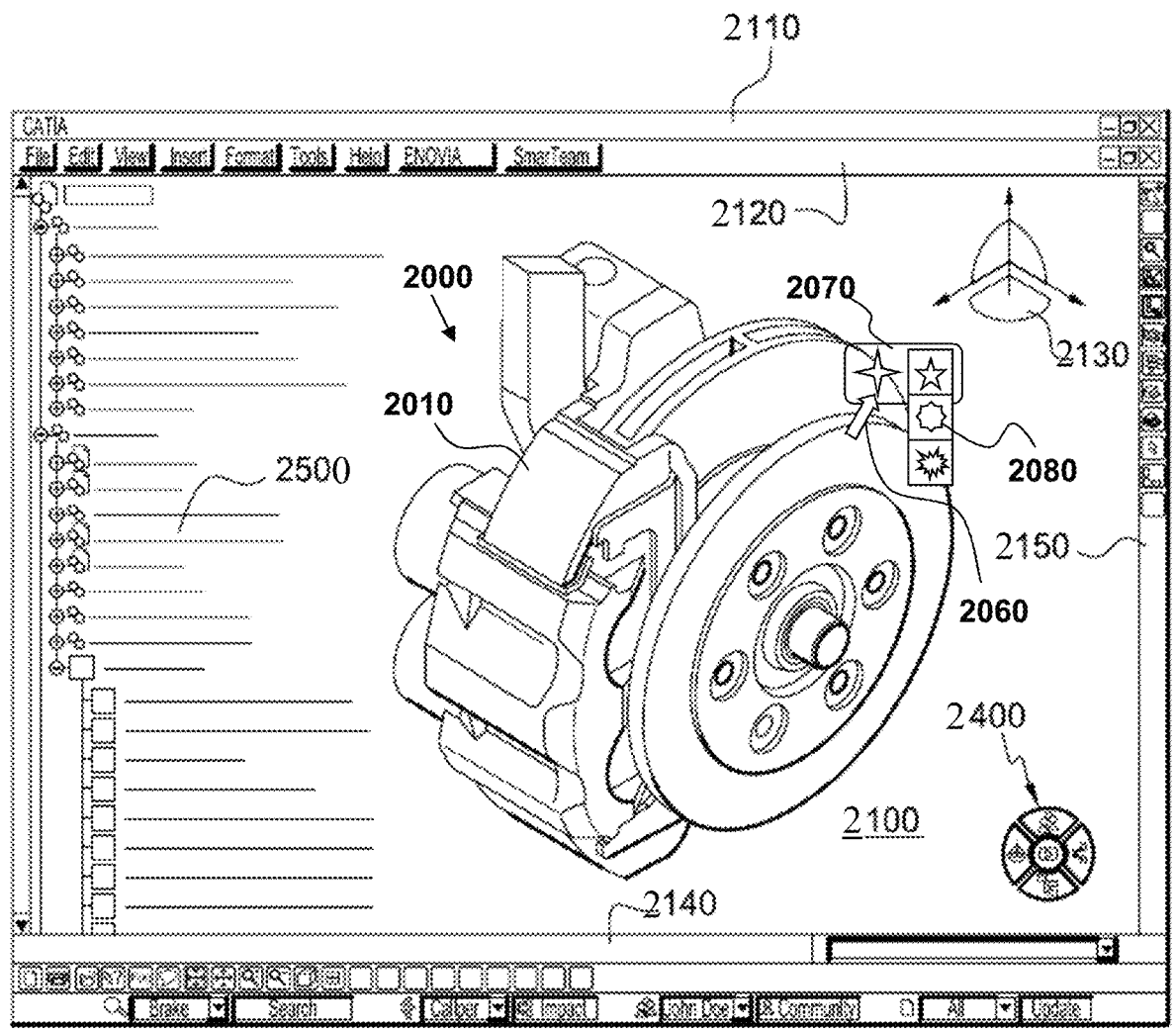
FIG. 2 shows an example of a graphical user interface of the system.

FIG. 2 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 2, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
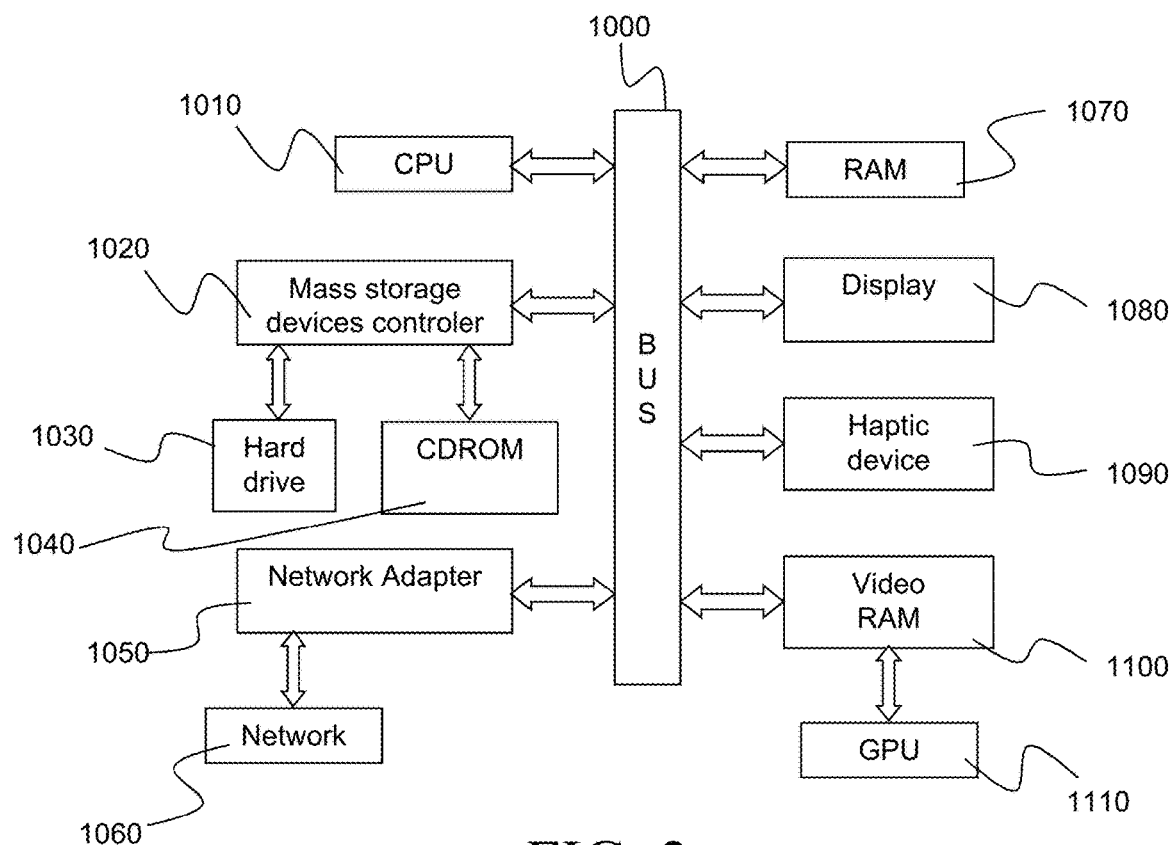
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the modeled object (e.g. a mold and/or a composite part, as discussed earlier). In any case, the modeled object designed by the method may represent a manufacturing object. The modeled object may thus be a modeled solid (i.e. a modeled object that represents a solid). Because the method improves the design of the modeled object, the method also improves the manufacturing of a product and thus increases productivity of the manufacturing process.

The example of FIG. 1 is now discussed in more details.

The method of the example comprises the providing S10 of input specifications, very classical in the design of composite parts. As mentioned earlier, these input specifications may be designed from scratch in any way (notably, with any software, e.g. belonging or not to the same software suite as the software underlying the execution of the method of FIG. 1), or retrieved from memory in any way (e.g. with possibly a later user-finalization before execution of the method of FIG. 1), for example upon the user launching a dedicated software functionality and selecting an input (e.g. from a library). These input specifications comprise a reference surface and a ply map defined with respect to the reference surface. Now, from the point of view of the method, these input specifications fully characterize the composite part initially, such that the method of FIG. 1 may run based exclusively on this input (but in examples together with additional data, as mentioned later).

The reference surface designates any data that define a 3D surface, such as a NURBS, a B-Rep or any parameterized surface. The method is for designing an outer surface of a composite part, and as a constraint to the method, the outer surface is eventually continuously connected (e.g. tangent continuous connection or C1 connection) to the reference surface (or part of such connection), the two surfaces thereby representing the envelope of a solid portion of the composite part. As such, the reference surface may represent the lower or upper surface of the lowest material layer, or the inner surface of the lower matrix of the mold, or (e.g. if the composite part is defined as a stacking in two directions) the lower or upper or central surface of a central material layer.

Now, the reference surface is associated to a ply map, which is by definition data that represent the stack of material layers between the reference surface and the outer surface (before the molding, and thus the potential flattening mentioned earlier). The portion of the composite part covered by the outer surface designed by the method thus includes such a stack of material layers. The ply map is defined as a list (i.e. ordered set, e.g. from the referenced surface to the top, i.e. along the stacking direction) of contours (i.e. closed curve or curves) defined on the reference surface. The ply map represents the material layers, which means that each contour is associated to the ply boundary of a respective material layer (i.e. it corresponds to such a ply boundary, such that each contour is a projection along the respective normal directions of the reference surface of the theoretic ply boundary). Each contour corresponds to a ply boundary (i.e. edge), which is by construction physically distant from the reference surface by the sum of thicknesses of material layers associated to all contours before it (the thickness associated to the contour under consideration being included in the sum). The contours are thus each associated to a thickness (the association being more that an abstract correspondence, but a data association, e.g. via pointer(s) and/or link(s) that allow retrieving the relevant sum of thicknesses for each contour), the sum of all these information representing the stack of material layers. Similarly, geometry (e.g. curves/lines or mesh edges) defined on or with respect to the reference surface may all be associated (with pointing data or abstractly) to geometry that belongs to the final surface (i.e. the outer surface being designed). The following discussions may indifferently refer to the geometry on the reference surface or to the associated final surface geometry with the same wording (for the sake of concision).

Now, the contours can be (for mechanical reasons) smaller and smaller, a contour being included (strictly or not) in the previous contour of the list (i.e. the contours thereby defining one or several geometrical pyramid(s) from the reference surface to the "top", and corresponding "steps" of the ply map, a "step" designating the restriction band of the reference surface delimited by two consecutive contours). In case this inclusion transitivity (along the ordering) is not respected, during the manufacturing resin is inserted between two layers separated by exactly one intermediary layer (a layer i and a layer i+2), against the intermediary layer (layer i+1) separating the two layers. In such a case, the problem can be rewritten and the outer surface can be designed in the same way, for example provided that the method comprises re-defining (e.g. automatically) the ply map, e.g. considering that the contour of the intermediary layer is the same as the one of the preceding layer or the one of the next layer, or somewhere between, e.g. an average of the two contours), or provided that the method disregards the intermediary layer and simply adds its thickness to the next layer or to the previous layer (such adaptation being an implementation detail). It is noted that the ply map can be provided as such a list of contours, or as any other form of data from which the list of contours can be retrieved (the distinction not being considered in the following).

The method of the example then comprises defining S20 constant offset surfaces. A constant offset surface is by definition a respective part of the outer surface which is to have a constant offset value relative to the reference surface. In other words, a constant offset surface is a constraint imposed to the method (specifically, a constraint taken into account at the later determining S50). This constraint can be defined in any way, provided that it leads to the respective parts of the outer surface having a constant offset value relative to the reference surface (e.g. the offset being measured with respect to a normal vector of the reference surface in the stacking direction). Composite parts indeed correspond to different plateaus unitarily formed (e.g. with resins binding the plateaus together and to the reference surface), depending on the configuration of the stack of material layers. And the method captures this information by imposing such a constraint, as when the constant offset zones are connected with a tangent continuous surface, this accurately represents a plausible composite part (i.e. that can be manufactured as such). In specific, the constant offset value of a respective constant offset surface corresponds, e.g. it is equal (substantially, as the thicknesses may be constant but alternatively not perfectly constant and thus regularized by the molding material, e.g. resin, and/or a layer of molding material with a negligible thickness may be superimposed over the top layer(s) of the stack of material layers, this negligible thickness being predetermined, e.g. constant or as a function of the parameters/configuration of the contemplated molding process), to the sum of the thicknesses of the material layers below the respective constant offset surface.

The definition S20 of constant offset surfaces can be performed in any way, e.g. fully automatically (e.g. based on an automatic analysis of the characteristics of the input specifications) and/or via-user-interaction (e.g. possibly including also semi-automatic definition). The example of FIG. 1 shows an example of such user-interaction to perform the definition S20, where the method comprises user-interaction to define concurrently (the order having no importance in the case of the example) at S22 a so-called "convolution radius" w (which performs for designated steps of the reference surface respective restrictions—the boundary lines computed at S24 bounding such restrictions—that are to correspond to a constant offset zone) and at S26 junction lines (which designate those steps, any other way to designate those steps being however possible, such as for example those steps being predetermined to the method, as designated to the application user, the junction lines forming thereby merely optional additional data), the term "defining" designating both the user setting values from scratch or the user validating/completing/correcting pre-computed values. It is noted that value w is called "convolution radius" (here already) because the same value may be in examples used in a convolution product (as discussed later), so that the result of the method is particularly accurate (although this is not necessary).

In the example, the constant offset zones are defined as restrictions of corresponding respective steps of the ply map. Now, as typical for a composite part, one category of steps ("first" steps in the following) of the ply map may be meant (e.g. by a user having designed the ply map) for a constant offset surface (that is, a plateau), while another category of steps (i.e. the other steps, that is, those between the first steps, "second" steps in the following) define so-called "transition zones" between the constant offset zones that are meant to receive molding material that performs a junction between the constant offset zones (i.e. zones of the outer surface which are never constant, at least for a significant width, e.g. more than the half or the quarter of the width of the corresponding step when projected on the reference surface, these zones being referred to as "transition surfaces" or again "transition zones"). Typically, and at least statistically (e.g. for at least 75% of the units considered in a case), first steps are relatively wide, while second steps are narrow and define successive steps (i.e. "stairs") between the first steps (before the molding smoothens everything).

This configuration can be specified fully by the user, or with computer automatic assistance (fully or semi-automatically), or predetermined to the method (i.e. the steps are pre-provided with a "first" or "second" type, and possibly with the junction lines as well, instead of having to define them at S26). In an example, the method is executed for a ply map where the smallest width of a first step (i.e. average or minimum distance between the two contours of said step), e.g. in the 75% highest tier of first steps with respect to the width, is larger than (e.g. at least once and a half) the largest width of a second step (the width being defined in the same way), e.g. in the 75% lowest tier of second steps with respect to the width. The system can in such a case compare distances and detect steps meant for constant offset zones and/or steps meant for transition zones automatically, and the user can potentially perform validations and/or corrections if necessary. This detection is a matter of implementation and not the subject of the present discussions.

In the example, first steps and second steps may be specified or completed by defining S26 junction lines, which are lines that each correspond to a respective curve on the reference surface that joins two consecutive first steps together (thereby defining second steps as all the steps encountered across the junction). Such junction lines can be proposed automatically to the user, and in examples the user may remove junction lines and/or add junction lines and/or perform corrections.

In parallel to this transition zones Versus constant offset zones definition S20 (e.g. via junction lines), the method comprises defining (in the example of FIG. 1, by the user) a so-called convolution radius w (explained in details later), and which at this stage is merely a distance value related to the flattening (that is, a value that determines the distance from the relevant ply boundary where the flattening is allowed, which degree of freedom is used to perform the tangent continuous connection). This can be entered via a prompt, possibly by the user validating or correcting a value proposed by the system. Be it precomputed by the system or provided ab initio by the user, w is associated to a distance from ply boundaries where the material layers are affected by the flattening mentioned earlier. In example implementations discussed later, w is precisely this distance. Thus, at a distance w from such ply boundaries and parallel to such ply boundaries, are located respective boundary lines of the constant offset surfaces (i.e. thereby delimiting the first steps). The other boundary line of a constant offset surface (i.e. the line parallel to the other contour of the concerned first step), may be defined parallel to said other contour (and thus can be considered parallel—but vertically offset, from the respective material layer thickness—to the corresponding ply boundary), for example at the same distance w from said contour (and this corresponds to the distance from the relevant ply boundary—projected on the reference surface—where molding material is deposited above the first step).

Now, whether these data are predetermined, defined fully automatically, fully manually by the user, and/or by the user validating/correcting/adding to automatically precomputed propositions, the method may respect the following configuration (which is typical of most common composite parts). The distance between the (concerned) boundary line of a respective constant offset surface and the respective ply boundary to which it is parallel (e.g. the convolution radius w in examples) may be different or the same for all transition zones and/or for both boundaries of each transition zone (e.g. in examples, it is the same and equal to w, where w can be a value inferior to 20 mm, 10 mm, e.g. of the order 5 mm). In examples, the composite part has a (largest) length higher than 0.1 m, 0.5 m or 2 m, and/or lower than 20 m, 10 m or 6 m. The composite parts comprises regions (at least 1, at least 2 or at least 5) formed of a number of plies each time higher than 2, 3 or 5 (typically of the order of 10). Each ply has a thickness of the order of 0.1 mm, typically higher than 0.01 mm and lower than 0.2 mm. And in these regions the plies form transition zones as explained earlier, with a width (e.g. lowest width) of the order of 5 mm. For each transition zone, this distance may be at least larger than (or substantially equal) the width of the second steps of the respective transition zone, for example of the order of the width of the second steps of the respective transition zone (e.g. in examples w is at least substantially equal to the width of the second steps of the respective transition zone). Now, the width of said second steps of a respective transition zone is not necessarily the same, such that any representative value (e.g. the average or the lowest value) may be retained. In case the same distance is retained for all transition zones and second steps respective to different transition zones are not the same, similarly a representative value of all second step widths (e.g. the average or the lowest value) may be retained. This increases accuracy and/or relevancy of the design. In this configuration, the first steps may have a width (again, a representative value, e.g. average or lowest value, may be retained in case all first steps of the composite part do not have the same width, e.g. and statistically speaking) which is at least once and a half, or twice, larger than the widths of the neighboring transition zones' second steps.

In an example, the junction lines comprise lines that join two respective boundary lines at pairs of vertices which are close to each other and/or at angles and/or zones of a curvature radius above a predetermined threshold of the respective boundary lines. Such angle-joining junction lines may be detected automatically and thus (e.g. all) suggested to the user automatically. The method may run with such automatically detected junction lines, but other junction lines added by the user may also be contemplated. As mentioned earlier, first steps may be designated in another way (from defining junction lines), for example (e.g. automatically or semi-automatically) based on the width considerations mentioned earlier. These are however details of implementation, and the person skilled in the art of composite parts can recognize how the designer or the algorithm can define at S26 the relevant junction lines. As a result, the output of S20 can be considered as predetermined data for the following discussions about the rest of the method.

The method may at this point run an algorithm, based on a meshing of the reference surface (i.e. a mesh fitting the reference surface, with respect to a predetermined error distance, called "sag value" as widely known). The mesh may be determined in any way, for example automatically (at S40 in the case of the example of FIG. 1), the resolution of the meshing (i.e. number of tiles per surface unit, thereby determining or being determined by the sag value) being for example a function of the value of the convolution radius w (e.g. such that two rows or more of mesh tiles can be included between a contour and a parallel boundary line). The mesh may be any type of 3D mesh, e.g. a quad mesh or a triangular mesh, providing vertices (i.e. 3D positions) connected two-by-two by edges. The examples provided later are based on a triangular mesh in specific. The mesh may respect one or more different constraints. One constraint is that the contours of the ply map are formed by respective connected edges of the mesh. In other words, the contours of the ply map are confounded with lines of the mesh (i.e. series of connected edges of the mesh). Another constraint is that other respective connected edges of the mesh are confounded in a similar way with the boundary lines of the constant offset surfaces (as projected on the reference surface). Yet another constraint is that yet other respective connected edges of the mesh are confounded in a similar way with the junction lines. In conjunction with $f^*$ mapping such edges in bijection ($f^*$ defines a bijection from the connected edges to the image) with their corresponding 3D (ply boundaries, parallel boundary lines, and junctions between transition zone "ramps"), such constraints allow the final surface to respect the initial topology, and thereby reach a relatively accurate and/or realistic result. The junction lines are an option that allow an increase of accuracy in the shaping of the transition zones, precisely by defining a regular border between different ramps of the transition zone.

Figure 4:
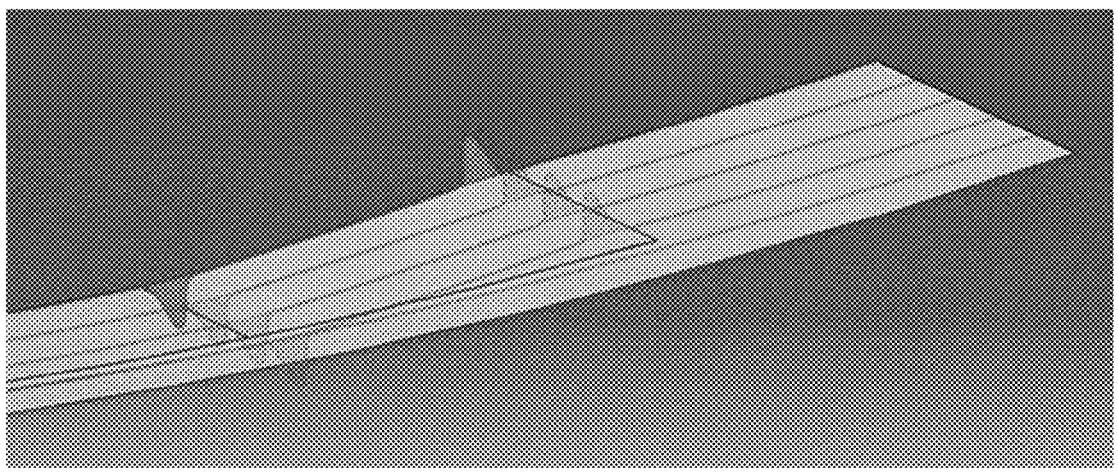
FIGS. 4, 5, 6, 7, 8, 9, 10, 11, 12, 13, 14, 15, 16, 17, 18, 19, 20, 21, 22, 23, 24, 25, 26, 27, 28, 29, 30, 31A, 31B, 32 and 33 illustrate the method.

The method of the example of FIG. 1 then comprises determining S50 a final surface that corresponds to a tangent continuous connection of the constant offset surfaces. As a result, the method provides a resulting final surface (that represents the outer surface) which features different elements. The topology of the resulting surface features junction lines and boundary edges of constant offset regions. Each topological face of the resulting surface is twice continuously differentiable. Connections between faces of the resulting surface are tangent plane continuous. Curvature analysis may disclose a typical convolution regularized profile, as illustrated in FIG. 4. Some multi process can be activated. Surfaces underlying constant offset regions can be procedural offset surfaces.

Examples of the method are now discussed in further details, with reference to FIGS. 5-33.

Figure 5:
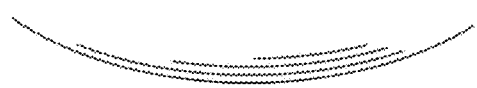
Figure 6:
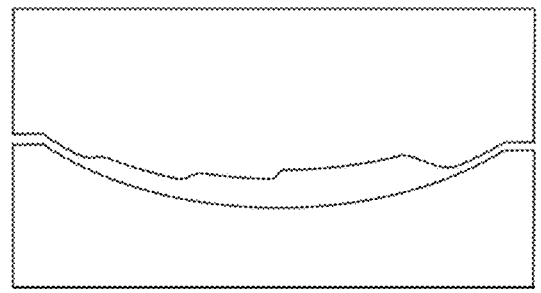
Figure 7:
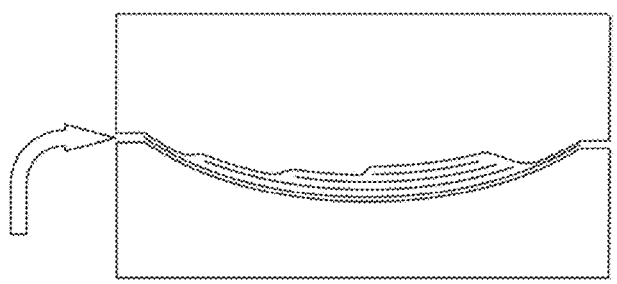
Figure 8:
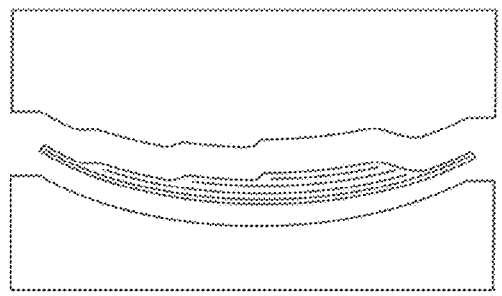

An example of a contemplated Resin Transfer Molding (RTM) process is now discussed. The RTM process (as detailed in the book "*Principles of the manufacturing of composite materials*", Suong V. Hoa, DEStech Publications, Inc., 2009, chapter 7, Liquid Composite Molding) is dedicated to manufacture composite parts. This process is particularly used in the aerospace industry. Firstly, plies are laid up as a dry stack of materials, named "fabric" or "preform" as illustrated in FIG. 5. Then, this fabric is placed into a mold including of a lower matrix and an upper matrix. This mold is made of stiff metal. It is the counter shape of the final composite part, as illustrated in FIG. 6. After the upper matrix is clamped over the lower matrix, the resin is injected into the cavity (inside which the fabric is confined) as illustrated in FIG. 7 by the arrow. Once all the fabric is wet out, the resin inlets are closed, and the laminate is allowed to cure. Both injection and cure can take place at either ambient or elevated temperature. Finally, the mold is opened and the resulting composite part is removed, as illustrated in FIG. 8.

Prior to the industrial production, the actual shape of the resulting composite part is usually needed to machine the mold. A use of the method is to compute this shape. It features the architecture of the composite part, defined by the ply map, as well as the overall smoothness. This smoothness guaranties that the mold itself can be machined by a cutting tool, that, when injected, resin easily flows into the cavity, and the surface quality of the resulting part.

Figure 9:
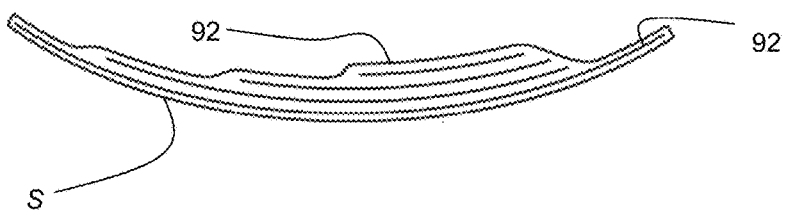
Figure 10:
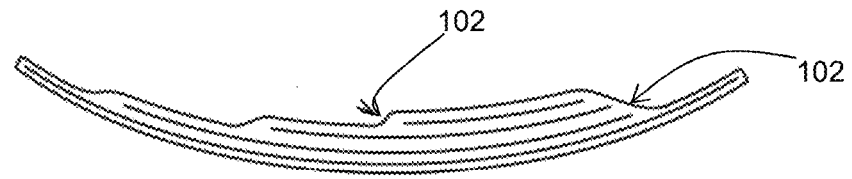
Figure 11:
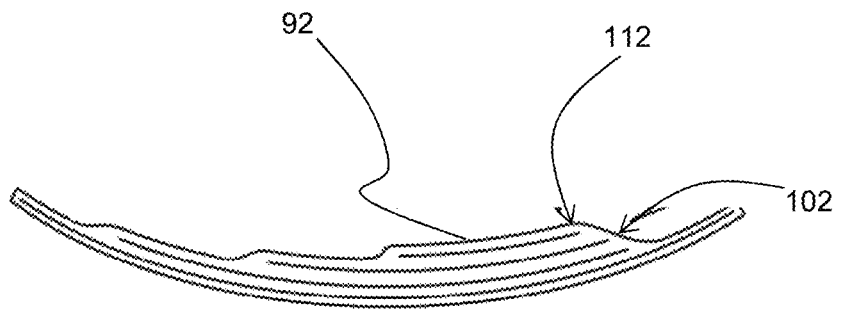
Figure 12:
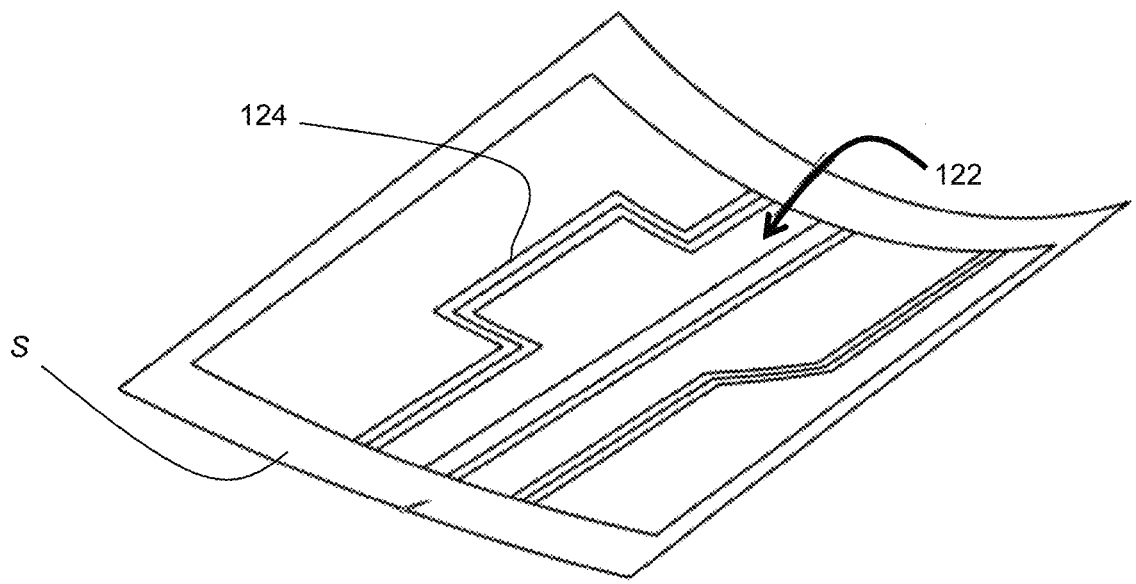
Figure 13:
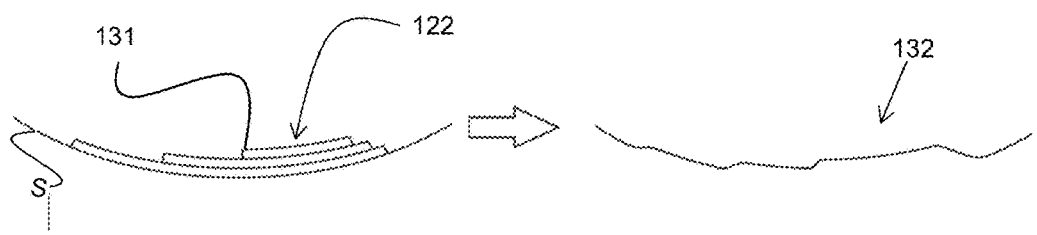

The following types of zone of the resulting geometry are particularly important for mold quality. The first type is the "constant offset surface". It is located at a constant distance from the reference surface. The offset value is proportional to the number of stacked plies, as illustrated in FIG. 9, which shows constant offset surfaces 92 and reference surface S, and the stacked plies in-between. The second type is the "transition surface" 102. It is the joining between two constant offset surfaces, as illustrated in FIG. 10. A transition surface is located at borders of plies and its height depends on the number of stacked plies. A last type of zone one can refer to as is the so-called "connection" 112 between a constant offset surface and a transition surface, as illustrated in FIG. 11 (which can also be seen as a part of the transition zone, or as the curve that borders a constant offset zone and the neighboring transition zone, this being merely a matter of convention).

In an example, the input of the method is the ply map. It is the layout of plies, defined on an input reference surface S, each ply being associated with an offset value. The ply map 122 and the reference surface S are the topological and geometrical specifications of a composite part, as shown on FIG. 12 which also illustrates contours 124 of the ply map 122. The output of the method of the example is the virtual shape 132 of the composite part manufactured from these specifications through the RTM process, as shown on FIG. 13. This virtual shape can be used to define the numerical command for machining the mold matrices. It can be used as well to model the composite part in the CAD system for digital mockup purpose. The ply map defines the layout of plies, each ply being defined by an offset value and a closed contour on the reference surface. In turn, this defines constant offset zones and non-constant offset zones with respect to the reference surface. Non-constant offset zones feature step-like discontinuous variations. They are optionally localized by junction lines.

Figure 14:
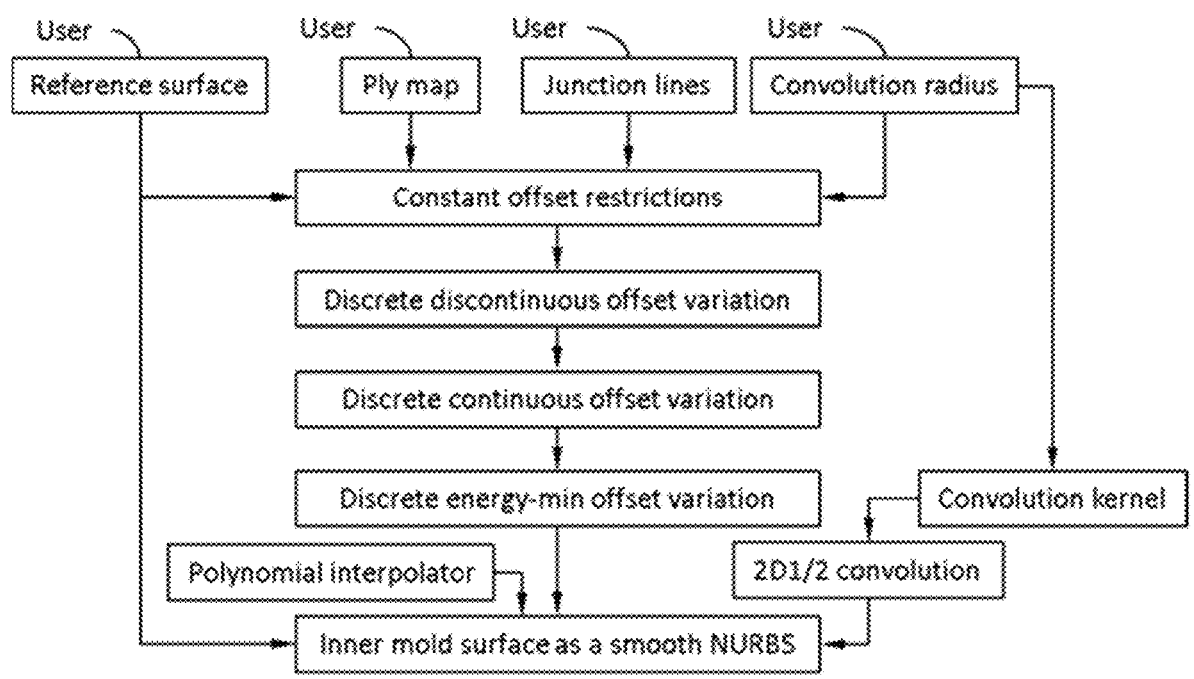

In an example, the first step of the method is to compute the restriction of constant offset zones that will remain invariant in the output shape. The shrink value of these invariant restriction zones may be a user-defined radius. The second step of the example computes a meshing $\Sigma$ of the reference surface S that is compliant with the topology of the ply map and the invariant restrictions. Each triangle T is associated with an offset value $f_0(T)$ corresponding to the cumulated offsets of stacked plies. This is the discontinuous offset variation $f_0$. The third step of the example considers a change of the discontinuous offset variation into a continuous offset variation $f$ by using the P1 finite element interpolation (as explained for example in University of Aix-Marseille's R. Herbin's lecture textbook of Feb. 2, 2012, Chapter 4, "*Elements finis de Lagrange*", which can be found at the website of the Aix-Marseille Université, Centre de Mathématiques et d'Informatique, www.cmi.univ-mrs.fr/~herbin/TELE/M1/chap4.pdf. The fourth step of the example changes the step like transition zones into linear offset transition zones by minimizing an energy criterion. This yields an improved offset variation $f^*$. The last step of the example defines the smooth offset variation $f^{**}$ as the convolution product of the offset variation $f^*$ with a convolution kernel φ. The mathematical structure of the convolution kernel used in the method allows reaching an industrially practical result. It involves the user-defined radius. The polynomial output mold surface is computed by approximating the surface obtained by applying the smooth offset variation $f^{**}$. This example is illustrated by the flowchart of FIG. 14.

In an example, the final surface (e.g. the mold surface) is computed as a variable offset of the reference surface. The variable offset of a given surface is based on an offset variation as defined below. The principle of the method of the example is to provide a smooth polynomial offset variation on the reference surface by starting from a discontinuous offset variation defined on a triangular meshing of the reference surface.

The concept of offset variation is now discussed.

Figure 15:
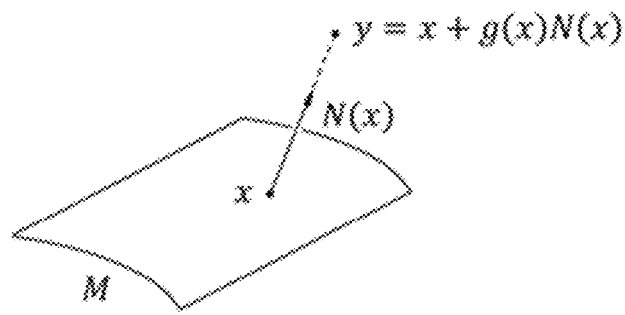

Let $M \subset \mathbb{R}^3$ be a surface. An offset variation g on M is a mapping $g: M \to \mathbb{R}$. It is interpreted as follows. Given a point $x \in M$ and N(x) the normal vector of surface M at point x, the corresponding offset point y is defined by $y = x + g(x)N(x)$, as illustrated in FIG. 15. The variable offset surface M' of M defined by the offset variation g is $M' = \{x + g(x)N(x), x \in M\}$.

Suppose now that surface M is a parameterized surface, meaning that M is the image of a mapping $S: [a,b] \times [c,d] \to \mathbb{R}^3$, which is written $M = \{S(u,v), (u,v) \in [a,b] \times [c,d]\}$. The offset variation g on M defines an offset variation on $[a,b] \times [c,d]$ noted $h: [a,b] \times [c,d] \to \mathbb{R}$ by $h(u,v) = g(S(u,v))$. The offset point of (u,v) is $S(u,v) + h(u,v)N(u,v)$ where $$N(u,v) = \frac{S_u(u,v) \times S_v(u,v)}{|S_u(u,v) \times S_v(u,v)|}$$

is the normal vector of parameterized surface S. The variable offset surface of S defined by the offset variation h is parameterized by $S': [a,b] \times [c,d] \to \mathbb{R}^3$ with $S'(u,v) = S(u,v) + h(u,v)N(u,v)$.

Geometrical and numerical input data of examples of the method are now discussed.

From the geometrical point of view, input data may be defined by the reference surface and by a list of closed contours $C_i$, i=1, ..., n, on the reference surface, each contour being the boundary of a ply. Each contour $C_i$ is associated with a thickness $t_i > 0$.

Additional input data may be provided.

Figure 16:
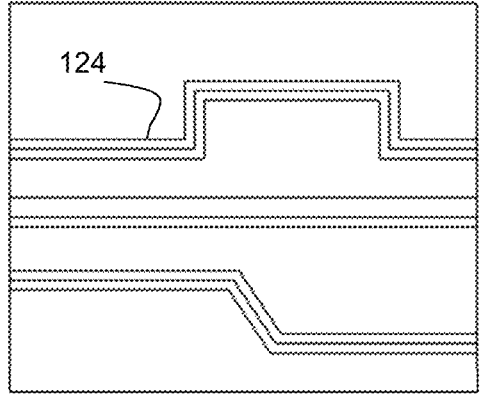
Figure 17:
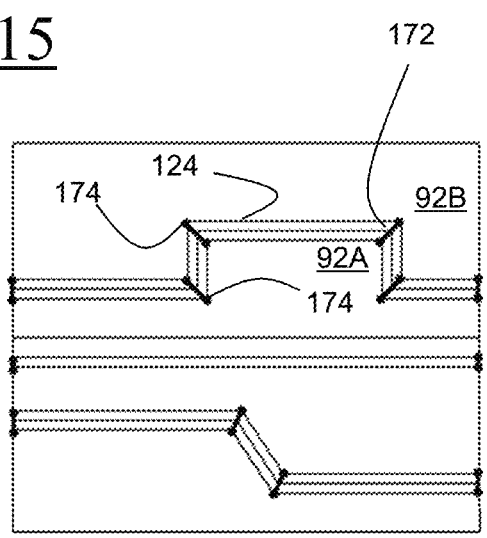

In addition to the group of plies and thicknesses as defined previously, the user may be asked to provide (e.g. or validate or correct/complete) the so-called "junction lines" mentioned earlier. Alternatively or additionally, the user may simply designate first steps, or yet this can be performed automatically in any way or be predetermined to the method. These lines define where the transition zones are located, separating the constant offset zones, that the algorithm is intended to smooth. For example, FIG. 16 illustrates a typical ply map with contours 124. FIG. 17 illustrates the user-defined junction lines (bold lines 172 joining angles 174).

Figure 18:
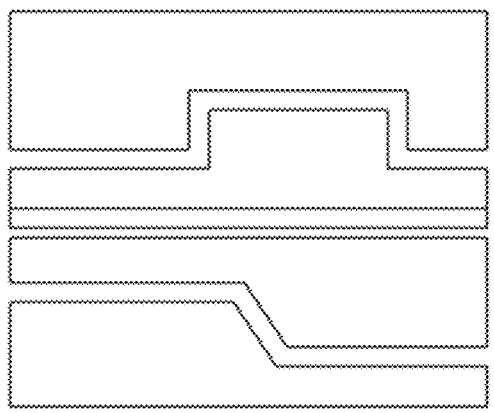
Figure 19:
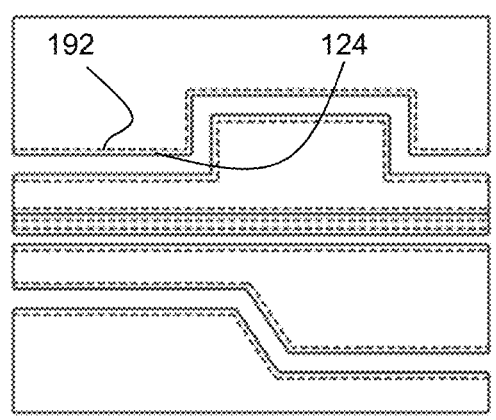
Figure 20:
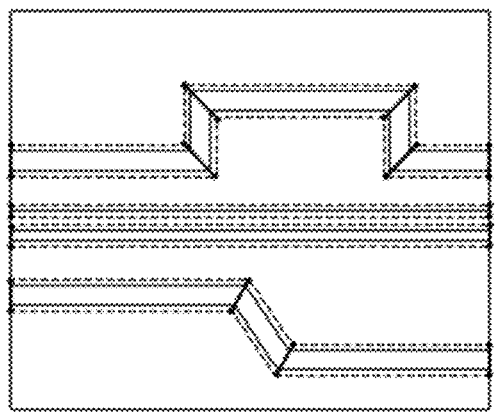
Figure 21:
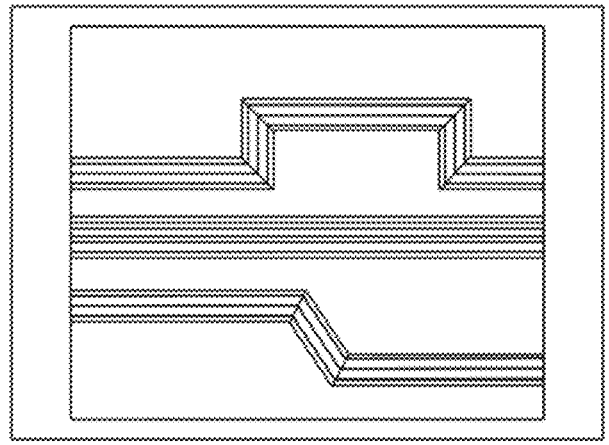
Figure 22:
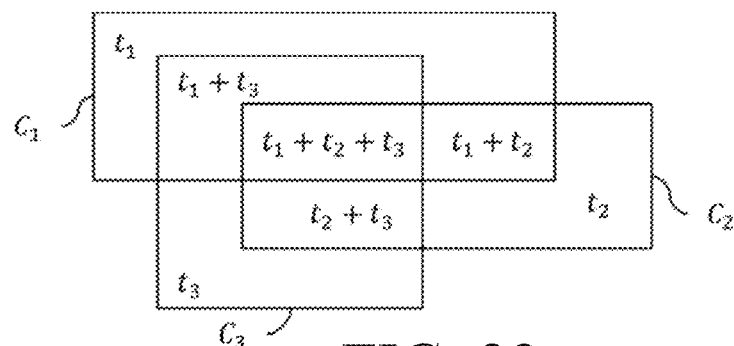

Computing the parallel boundary lines of constant offset zones may then be performed automatically and easily. Junction lines define transition zones. Constant offset zones are the remaining ones, as illustrated in FIG. 18. Parallel lines may be computed from boundary lines of constant offset zones according to the following procedure. For each constant offset zone, get the boundary line that does not belong to the outside boundary. Parallel boundary line of this boundary line is computed toward the inside of the constant offset zone. The distance between the boundary line and the parallel boundary line is the user-defined convolution radius. FIG. 19 illustrates the parallel boundary lines (dotted lines 192) of constant offset zones. In addition, junction lines may be updated by joining the corresponding vertices of parallel boundary lines. FIG. 20 illustrates the updated junction lines (bold lines). The initial ply map may thus be enriched with all parallel boundary lines and updated optional junction lines defined previously. This yields a topology that splits the reference surface into a bunch of adjacent faces, as illustrated in FIG. 21. Each face of this topology is associated (thanks to the input data and to each face corresponding to a respective step) with an offset value computed by cumulating offset values of overlapping plies. FIG. 22 illustrates the cumulated offset values over each region defined by plies overlapping.

An example of the computing of a compliant meshing Σ at S40 is now discussed.

Figure 23:
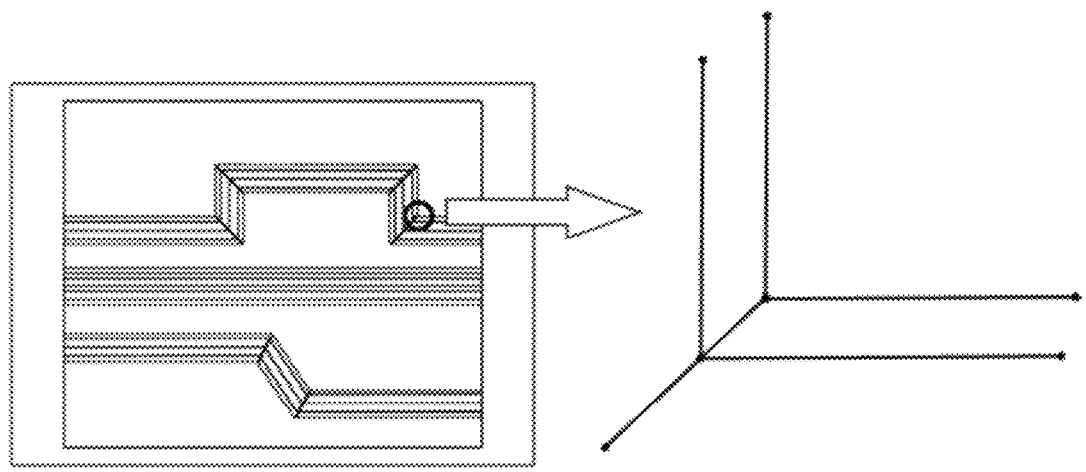
Figure 24:
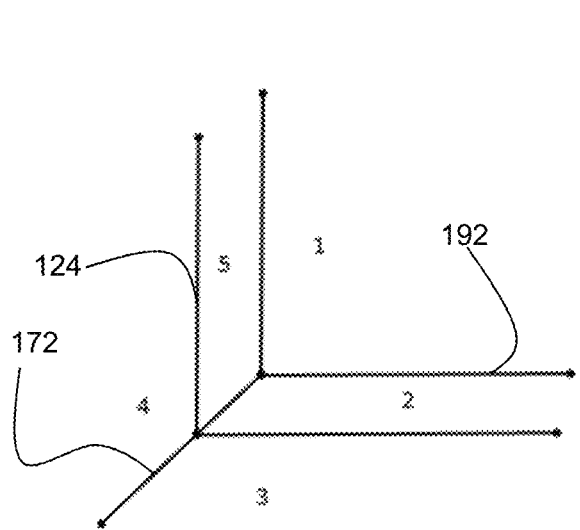
Figure 25:
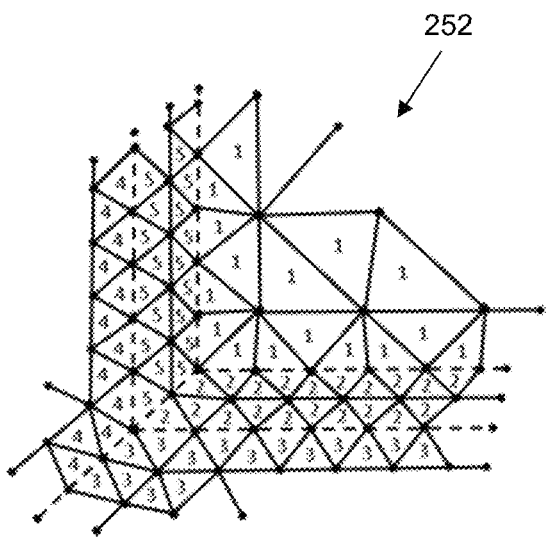

The split reference surface may now be meshed in such a way that the triangles layout is compatible with the topology of adjacent faces, meaning that each triangle is associated with one face. The triangles density is governed by a sag value. Traditionally, a too small sag value leads to memory consumption and long computing time. Industrial tests prove that a good compromise is $$\frac{w}{100}$$

where w is the user-defined convolution radius (any value falling around this value+/−50% can also be contemplated). Anyway, the sag value may be larger than $2.0 \times 10^{-3}$ mm. The meshing disclosed in paper "L. A. Piegel, A. M. Richard, *Tessellating trimmed NURBS surfaces*, CAD, Vol. 27, No. 1, pp 16-26, 1995" may be appropriately used in the context of the method. FIG. 23 illustrates the local topology of adjacent faces. FIG. 24 illustrates five faces 1, 2, 3, 4 and 5 of previous local topology. The compliant meshing of the local topology is illustrated in FIG. 25. Dotted lines are the polylines approximating faces boundary. Notice that no triangle segment line features one vertex in a face and another vertex in another face (in other words, each line of the topology is fit by the meshing with an uninterrupted line of connected edges of the mesh, which is then mapped onto a corresponding curve in the final surface or stack of material layers). The resulting meshing is noted Σ. It should be understood that Σ remains unaffected all though the subsequent process. It is not deformed, Σ is a read only data. It is used to define a sequence of smoother and smoother offset variations $f_0: \Sigma \to \mathbb{R}$, $f: \Sigma \to \mathbb{R}$, $f^*: \Sigma \to \mathbb{R}$ and finally $f^{**}: \Sigma \to \mathbb{R}$ as explained in the following.

In the following, it is provided an example of the method wherein the final surface corresponds to a convolution product between a function $f^*$ defining a continuous connection of the constant offset surfaces that interpolates the ply boundaries (i.e. the ply boundaries belong, as a constraint, to the image of function $f^*$ on the mesh, e.g. the interpolation being performed smoothly and/or monotonously between two interpolations) and a convolution kernel $\phi$ defined for $x \in \mathbb{R}^3$ and of the type $\phi(x)=0$ if $\|x\|>w$, where $\|x\|$ is the Euclidean norm of x and $w>0$ is the convolution radius. Specific examples which are efficient for arriving at this mathematical result are presented. However, the method may implement any other algorithm to arrive at the same mathematical result. For example, all values of functions $f_0$ and $f$ are not necessarily computed (at least entirely) as such. Indeed, only some values are needed and can be used as constraints of the later-defined energy without the computations of the whole functions (the definition of the functions standing in the following as a mere example, for the sake of clarity). Also, values of function $f$ need not necessarily be computed. Function $f$ may indeed be merely an efficient starting point for the specific program used for the energy minimization (e.g. Gauss-Seidel), as it is close to the result $f^*$ (being noted that minimizations are often performed approximately by heuristics, as known per se, and that good starting points are thus relevant for the efficiency of a minimization algorithm).

Discrete Discontinuous Offset Variation $f_0$

Figure 26:
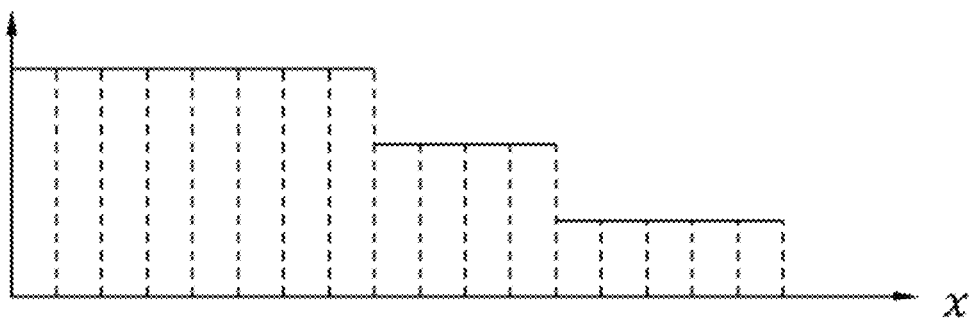

In a first step of the example, the offset value $f_0(T)$ associated with each triangle T of $\Sigma$ is the one of the face it belongs to. This defines on $\Sigma$ an offset variation $f_0:\Sigma \to \mathbb{R}$ that is not continuous at edges and vertices shared by triangles equipped with distinct offset values. FIG. 26 illustrates the shape of $f_0$ over a planar mesh.

Discrete Continuous Offset Variation $f$

The previous discontinuous offset variation is made continuous by using the following method. The principle is to define the offset value at each vertex and to compute offset values at other points by interpolating offset values of vertices. This is the P1 finite element strategy.

Let x be a vertex and let $Adj(x)$ be the set of triangles adjacent to this vertex. The offset value $f(x)$ is computed as the maximum value of its adjacent triangles offset values.

$$f(x) := \max_{T \in Adj(x)} f_0(T)$$

Let x be a point on $\Sigma$. Then, x necessarily belongs to a triangle T. Let a, b and c be the vertices of triangle T. The offset value $f(x)$ associated with point x is the convex combination of offset values at vertices a, b and c:

$$f(x) := \alpha(x)f(a) + \beta(x)f(b) + \gamma(x)f(c)$$

With $$\alpha(x) = \frac{Area(x, b, c)}{Area(a, b, c)}$$

$$\beta(x) = \frac{Area(a, x, c)}{Area(a, b, c)}$$

$$\gamma(x) = \frac{Area(a, b, x)}{Area(a, b, c)}$$

Figure 27:
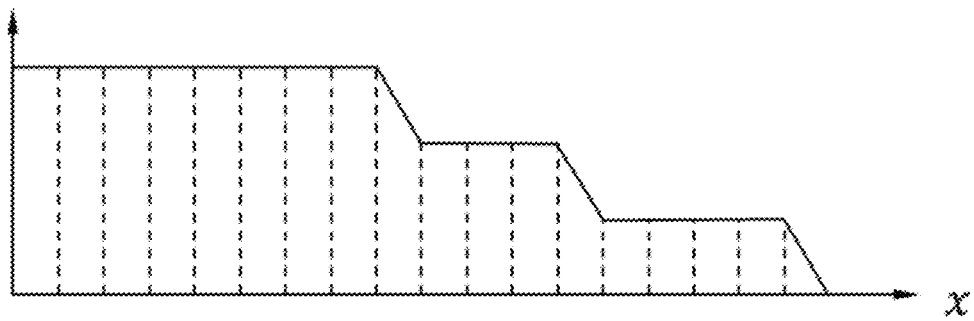

It should be noticed that if point x is shared by several triangles, the offset value does not depend on the triangle chosen for the computation. This property makes $f:\Sigma \to \mathbb{R}$ continuous. FIG. 27 illustrates the shape of $f$ over a planar mesh.

Discrete Continuous and Energy Minimum Offset Variation $f^*$

Now, function $f^*$ may correspond to a minimum of an energy that penalizes the image of $f^*$ over each face of the mesh deviating from a constant value. As the image of $f^*$ over each face of the mesh may be an affine mapping, the energy may tend to render—globally—all such tile transforms horizontal, yet ensuring the connectivity constraint.

Figure 28:
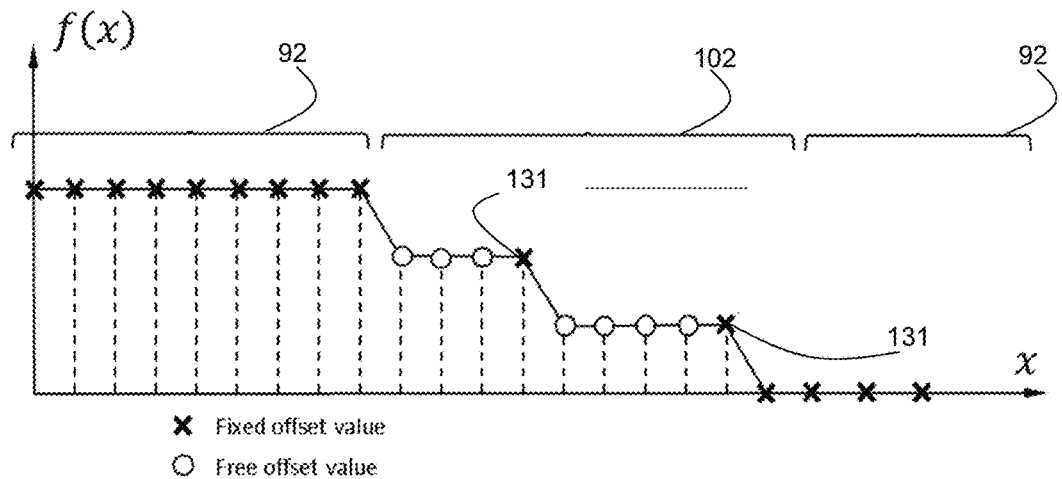

The offset variation $f:\Sigma \to \mathbb{R}$ is continuous over the mesh $\Sigma$. Nevertheless, the step-like shape of transition zones is unsatisfactory. The best offset variation over transition zones is as linear as possible, which is a result of this example. Vertices $v_i$ of mesh $\Sigma$ are divided into two sets: (1) fixed vertices and (2) free vertices. Vertices of constant offset zones are fixed. Vertices of ply boundaries are fixed. Vertices between constant offset zones and the ply boundaries respective to the constant offset zones (i.e. contours parallel to boundary liens of the constant offset zones) are also fixed. Other vertices are free. This way, all free vertices belong to transition zones, but not all vertices of transition zones are free, as illustrated in FIG. 28 (which extrapolates constant offset zones 92 for additional fixed vertices at the constant offset).

Under appropriate renumbering, and for readability, free vertices are noted $v_i$ for i=1, . . . , n. Transition zones are improved by adjusting the offset value of the free vertices. So far, each vertex v of $\Sigma$ is associated with an offset value $f(v)$. The unknowns of the regularization problem are offset values of free vertices, noted $\lambda_i$ for i=1, . . . , n. Current values of $\lambda_i$ are $\lambda_i = f(v_i)$ for i=1, . . . , n. Values $f(v_i)$ of fixed vertices $v_i$, i>n are kept unchanged.

Once more, this optimization process is not used to deform mesh $\Sigma$. It is used to change the values of the offset variation $f$ that is defined on $\Sigma$.

Energy Criterion

The step-like improvement is performed in the example by minimizing an energy criterion. This criterion is based on local versions of $f$ associated with each triangle $T_i$ of $\Sigma$, and noted $f_{T_i}$. The energy of each local $f_{T_i}$ is noted $E(f_{T_i})$ and the overall energy $E(f)$ of $f$ is the sum of local energies:

$$E(f) = \sum_{i=1}^{m} E(f_{T_i})$$

Figure 29:
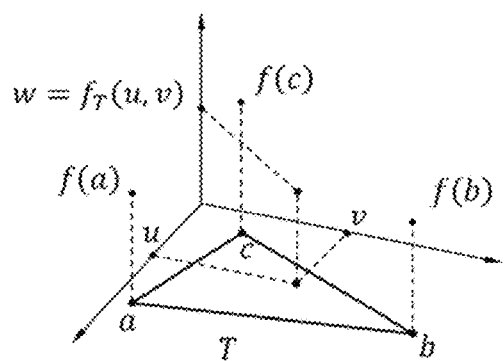

Let T be an arbitrary triangle of $\Sigma$. The local $f_T$ and its energy $E(f_T)$ are defined as follows. Let a, b and c be the vertices of triangle T. Firstly, an appropriate orthogonal axis system uvw is defined such that points a, b and c are in plane uv. Let $(u_a,v_a)$, $(u_b,v_b)$ and $(u_c,v_c)$ the respective coordinates of points a, b and c in plane uv. Then, $f_T$ is the affine mapping $f_T:\mathbb{R}^2 \to \mathbb{R}$ such that $f_T(u_a,v_a)=f(a)$, $f_T(u_b,v_b)=f(b)$, and $f_T(u_c,v_c)=f(c)$, as illustrated in FIG. 29.

It can be uniquely written $f_T(u,v)=k_1u+k_2v+k_3$ where scalar coefficients $k_i$ depend on $(u_a,v_a)$, $(u_b,v_b)$, $(u_c,v_c)$, $f(a)$, $f(b)$, and $f(c)$. The energy of $f_T$ is defined by:

$$E(f_T) = \int_T |\nabla f_T(u, v)|^2 du dv$$

Since $f_T$ is an affine mapping, its gradient $\nabla f_T$ does not depend on (u,v) so that previous integral is $E(f_T)=Area(T)|\nabla f_T|^2$. Elementary computation shows that:

$$E(f_T) = \frac{1}{\text{Area}(T)}|f(a)(b-c) + f(b)(c-a) + f(c)(a-b)|^2$$

Noting p(i), q(i) and r(i) the vertices indexes of triangle $T_i$ and introducing the notation $\lambda_i = f(v_i)$ of the unknowns, this can be written as:

$$E(f_{T_i}) = \frac{1}{\text{Area}(T_i)}|\lambda_{p(i)}(v_{q(i)} - v_{r(i)}) + \lambda_{q(i)}(v_{r(i)} - v_{p(i)}) + \lambda_{r(i)}(v_{p(i)} - v_{q(i)})|^2$$

It is clear that previous formula is a degree two polynomial with respect to each variables $\lambda_{p(i)}$, $\lambda_{q(i)}$ and $\lambda_{r(i)}$. This polynomial is noted:

$$D_i(X, Y, Z) = \frac{1}{\text{Area}(T_i)}|X(v_{q(i)} - v_{r(i)}) + Y(v_{r(i)} - v_{p(i)}) + Z(v_{p(i)} - v_{q(i)})|^2$$

Finally, the energy $E(f)$ is written introducing scalar unknowns $\lambda_i$:

$$E(\lambda_1, \ldots, \lambda_n) = \sum_{i=1}^{m} D_i(\lambda_{p(i)}, \lambda_{q(i)}, \lambda_{r(i)})$$

In the right hand expression of previous formula, symbols $\lambda_k$ where k>n are in fact fixed values $f(v_k)$.

Finally, the minimization problem may be written as:

$$\min_{(\lambda_1,\ldots,\lambda_n) \in \mathbb{R}^n} E(\lambda_1, \ldots, \lambda_n)$$

Gauss-Seidel minimization is an example solution for the minimization problem.

By construction, for each i=1, . . . , n the partial mapping $\lambda_i \to E(\lambda_1, \ldots, \lambda_n)$ is a degree two polynomial in variable $\lambda_i$. The abscissa $\bar{\lambda}_i$ of its minimum value is the zero of its derivative, which is a straightforward computation thanks of degree two. The algorithm to minimize $E(\lambda_1, \ldots, \lambda_n)$ may be a Gauss-Seidel process (as described for example in *Computing Discrete Minimal Surface and Their Conjugates*, Ulrich Pinkall, Konrad Poltier) based on this property. Partial mappings are minimized iteratively until a stopping criterion $\varepsilon=10^{-6}$ is reached.

This is illustrated by the following pseudo-code:

```
(λ_1,...,λ_n):=(f(v_1),...,f(v_n))
Repeat
    e_0:=(λ_1,...,λ_n)
    For i:=1 to n do begin
        Compute λ̄_i such that partial mapping
            λ_i→E(λ_1,...,λ_n) is minimum
        λ_i:=λ̄_i
    End for
    e_1:=(λ_1,...,λ_n)
Until |e_1 - e_0| ≤ ε
```

Figure 30:
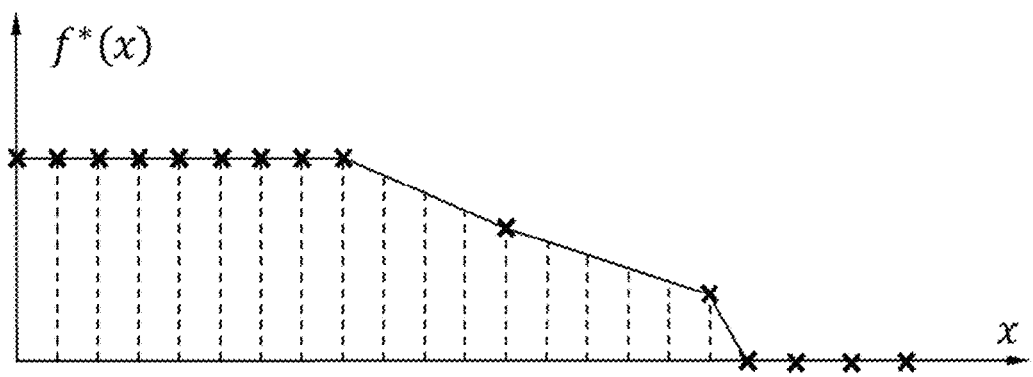
Figure 31B:
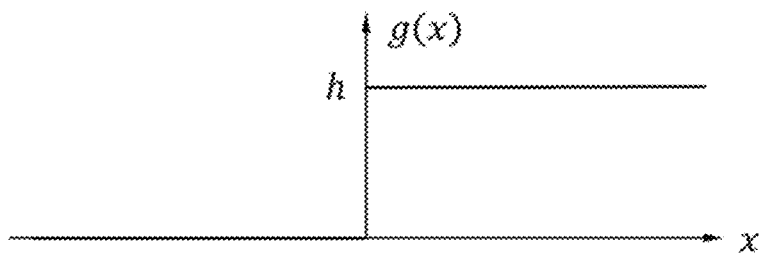

After convergence, the final parameters are noted $\lambda^*_1, \ldots, \lambda^*_n$. The offset variation mapping is now noted $f^*:\Sigma \to \mathbb{R}$ and is defined by $f^*(v_i)=f(v_i)$ if i>n and $f^*(v_i)=\lambda^*_i$ if $1 \le i \le n$. Values $f^*(x)$ where x is not a vertex are computed according to the P1 interpolation. FIG. 30 illustrates the shape of $f^*$ over a planar mesh. Unchanged $f(v_i)$ are bold "X".

Eventually, the method of the example considers a convolution product involving $f^*$.

The 1D convolution product is now discussed.

The convolution product (widely known and explained for example in *Convolution*, by Weisstein, Eric W, at the following mathworld.wolfram.com) is a mathematical feature that has been used in different fields, such as signal processing or probability, and that can be used in the context of the method as a tool for smoothing non-regular functions. Given two functions $h:\mathbb{R} \to \mathbb{R}$ and $g:\mathbb{R} \to \mathbb{R}$ such that their product $hg:\mathbb{R} \to \mathbb{R}$ is an integrable function, the convolution product of h and g is noted h*g and defined by:

$$(h*g)(x) = \int_{-\infty}^{+\infty} h(t)g(x-t)dt$$

Figure 31A:
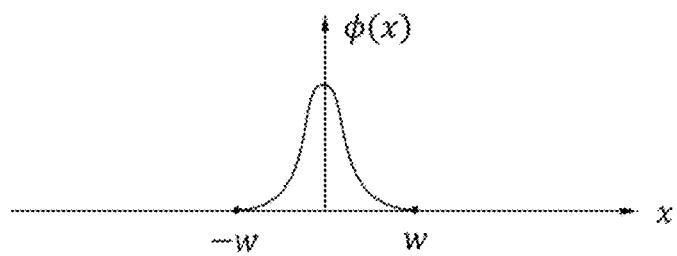

The method may make use of the convolution product as follows. Consider the function $\phi:\mathbb{R} \to \mathbb{R}$ named the "convolution kernel" and defined by $$\phi(x) = \frac{1}{k}(w^2 - x^2)^3$$

if $-w \le x \le w$ and $\phi(x)=0$ otherwise, where w>0 is a constant parameter: the convolution radius. Number $$k = \int_{-w}^{+w} (w^2 - x^2)^3 dx$$

is a normalization constant designed in such a way that $\int_{-\infty}^{+\infty} \phi(x)dx=1$. FIG. 31A illustrates the curve $x \to \phi(x)$.

Figure 32:
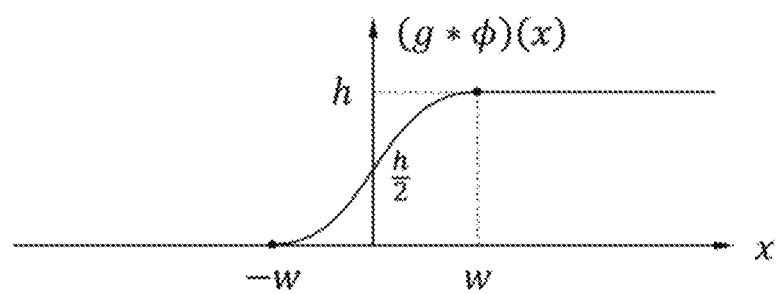

Function $\phi$ is a tool function used to smooth non regular functions. Consider the discontinuous function $g:\mathbb{R} \to \mathbb{R}$ defined by g(x)=h>0 if $x \ge 1$ and g(x)=0 otherwise, illustrated by FIG. 31B. Then, the convolution product g*$\phi$ is a regularization of g, meaning that it saves its variations and that it features a smooth shape, as illustrated in FIG. 32. Notice that the extent of the transition zone [−w,w] between two constant zones is governed by parameter w. Furthermore, the average slope angle $\alpha$ of the transition zone is such that tan $$\alpha = \frac{h}{2w}.$$

Now, the method may make use of a 3D convolution product in specific.

The convolution product is generalized to numerical functions defined on $\mathbb{R}^n$, but the example makes use of $\mathbb{R}^3$. The definition remains the same. Given $h:\mathbb{R}^3 \to \mathbb{R}$ and $g:\mathbb{R}^3 \to \mathbb{R}$ such that their product $hg:\mathbb{R}^3 \to \mathbb{R}$ is an integrable function, the convolution product of h and g is noted h*g and defined by:

$$(h*g)(x) = \int_{\mathbb{R}^3} h(t)g(x-t)dt$$

Where $x=(x_1,x_2,x_3)$, $t=(t_1,t_2,t_3)$ and $dt=dt_1dt_2dt_3$. Noting $\|x\|$ the Euclidean norm of $x \in \mathbb{R}^3$, the convolution kernel $\phi$ is:

$$\phi(x) = \frac{1}{k}(w^2 - \|x\|^2)^3 dx$$

if $\|x\| \le w$ and $\phi(x)=0$ otherwise, where $w>0$ is the convolution radius. The normalization number is:

$$k = \int_{\{\|x\|<w\}} (w^2 - \|x\|^2)^3 dx$$

By design, the first and second partial derivatives of this convolution kernel are continuous, which is noted $\phi \in C^2(\mathbb{R}^3)$.

An example of smoothing the 2D ½ discontinuous offset variation $f^{**}$ is now discussed.

The convolution product is designed to combine two functions defined on the same source set $\mathbb{R}^n$. In the context of the example, the function to be regularized is the offset variation of the reference surface $f^*:\Sigma \to \mathbb{R}$. Function $f^*$ is not defined on $\mathbb{R}^3$, but on a mesh of the reference surface which is a subset $\Sigma \subset \mathbb{R}^3$. Conversely, the convolution kernel $\phi$ is defined on $\mathbb{R}^3$. Consequently, the convolution definition may be adapted accordingly. For example, the method may define the regularized offset variation $f^{**}: \mathbb{R}^3 \to \mathbb{R}$ by:

$$f^{**}(x) = \int_\Sigma f^*(t)\phi(x-t)dt$$

Notice that $f^{**}$ is defined on $\mathbb{R}^3$ despite $f^*$ is defined on $\Sigma \subset \mathbb{R}^3$.

An alternate definition could be $f^{**}(x) = \int_{\mathbb{R}^3} h(t)\phi(x-t)dt$ where h is an extrapolation of $f^*$ defined on $\mathbb{R}^3$ and such that $h(x)=f^*(x)$ for all $x \in \Sigma$. The method may define such an extrapolation and compute the volume integral resulting from the three-dimensional convolution product $h*\phi$.

Noting $B(x,w)$ the w radius ball centered at point x, the formula becomes:

$$f^{**}(x) = \int_\Sigma f^*(t)\phi(x-t)dt = \sum_{i=1}^m \int_{T_i} f^*(t)\phi(x-t)dt = \sum_{i \in J(x)} \int_{T_i \cap B(x,w)} f^*(t)\phi(x-t)dt$$

Figure 33:
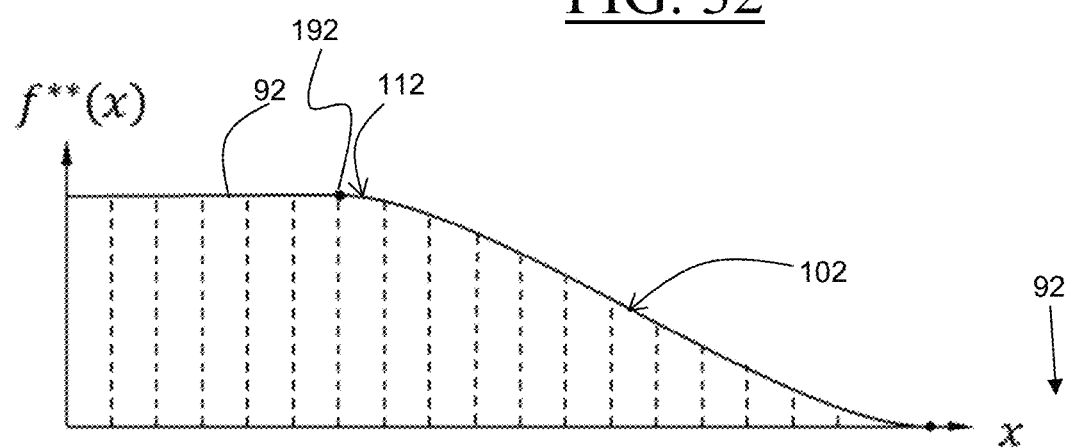

Set $J(x)$ is the subset of $\{1, \ldots, m\}$ that includes all triangle indexes i such that $T_i$ intersects $B(x,w)$. For computation purpose, identification of triangles $T_i$, $i \in J(x)$ may be achieved by using the teaching of paper "*ERIT: A collection of efficient and reliable intersection tests*, Martin Held, Journal of Graphics Tools, 2(4):25-44, 1997", and integral $\int_{T_i \cap B(x,w)} f^*(t)\phi(x-t)dt$ may be calculated by using the teaching of paper "*High Degree Efficient Symmetrical Gaussian Quadrature Rules for the Triangle*, D. A. Dunavant, Int. J. Num. Meth. Eng., 21, pp. 1129-1148 (1985)". FIG. 33 illustrates the shape of $f^{**}$ over a planar mesh.

If needed, derivating $f^{}$ may be performed easily. Partial derivatives of the smooth offset variation $f^{}(x)$ may notably be useful, for example to compute a polynomial approximation of $f^{}$ if wanted. The derivation is performed by switching the derivation operator and the integration sign. For example, noting $x=(x_1,x_2,x_3)$ the coordinates of x, the derivation of $f^{}$ with respect to $x_j$ is:

$$\frac{d}{dx_j}f^{**}(x) = \frac{d}{dx_j}\int_\Sigma f^*(t)\phi(x-t)dt = \int_\Sigma f^*(t)\frac{\partial}{\partial x_j}\phi(x-t)dt$$

It is evaluated by reusing the ball triangles intersection algorithm.

$$\frac{d}{dx_j}f^{**}(x) = \sum_{i \in J(x)} \int_{T_i \cap B(x,w)} f^*(t)\frac{\partial}{\partial x_j}\phi(x-t)dt$$

The theoretical variable offset surface is now definable. So far, offset variation improvements are performed by using the mesh $\Sigma$ of the reference surface. One can now define the offset variation with respect to the parameterization of the reference surface S. Given $(u,v) \in [a,b] \times [c,d]$, by definition $S(u,v) \in \mathbb{R}^3$. Let $P_\Sigma : \mathbb{R}^3 \to \Sigma$ be the projection on $\Sigma$ in the following sense. Given $x \in \mathbb{R}^3$, $P_\Sigma(x)$ is the point on $\Sigma$ minimizing the distance $|P_\Sigma(x)-x|$. Then, the variable offset mapping on $[a,b] \times [c,d]$ is defined by $\varphi:[a,b] \times [c,d] \to \mathbb{R}$ with $\varphi(u,v)=f^{}(P_\Sigma(S(u,v)))$. In other words, $S(u,v)$ is projected on the mesh, yielding point $P_\Sigma(S(u,v))$, from which the variable offset value $f^{}(P_\Sigma(S(u,v)))$ is computed.

The variable offset surface, which is the inner shape of the mold, is now defined by the following theoretical parameterization. It is noted $V:[a,b] \times [c,d] \to \mathbb{R}^3$ with $$V(u,v)=S(u,v)+\varphi(u,v)N(u,v)$$

Where $N(u,v)$ is the normal vector of reference surface S.

The formula for $V(u,v)$ may be approximated if required (but this is not necessary), for example to improve from the computational point of view. For example, the variable offset theoretical surface $V(u,v)$ may be approximated by a polynomial, as earlier-mentioned, which can be used to create a NURBS surface. This NURBS surface may be the persistent CAD data used by downstream applications, mainly digital mockup and mold machining. This is however out of the scope of the present discussion.

The invention claimed is:

1. A computer-implemented method for designing an outer surface of a composite part manufactured by molding a stack of material layers, each material layer having a respective thickness and a respective ply boundary, the method comprising:
   obtaining a reference surface and a ply map that represents the stack of material layers between the reference surface and the outer surface, the ply map being defined as a list of contours defined on the reference surface, each contour being associated to the ply boundary of a respective material layer;
   defining constant offset surfaces, a constant offset surface being a respective part of the outer surface which is to have a constant offset value relative to the reference surface, the constant offset value of a respective constant offset surface corresponding to the sum of the thicknesses of the material layers below the respective constant offset surface;

determining a final surface that corresponds to a tangent continuous connection of the constant offset surfaces, each constant offset surface comprising at least a respective portion which remains invariant in the final surface; and applying the determined final surface in a 3D design of the composite part to be manufactured using a mold that physically corresponds to the determined final surface, wherein each transition surface corresponds to a convolution product between a function $f^*$ defining a continuous connection of the constant offset surfaces that interpolates the ply boundaries and a convolution kernel $\phi$ defined for $x \in \mathbb{R}^3$ and of the type $\phi(x)=0$ if $\|x\|>w$, where $\|x\|$ is the Euclidean norm of x and $w>0$ is the convolution radius.

2. The method of claim 1, wherein the constant offset surfaces each have a respective boundary line parallel to the ply boundary of a respective material layer, the distance between the boundary line of a respective constant offset surface and the ply boundary of the respective material layer being larger than or substantially equal to a step width between the respective constant offset surface and the next and lower constant offset surface.

3. The method of claim 1, wherein the convolution kernel is of the type $$\phi(x) = \frac{1}{k}(w^2 - \|x\|^2)^3$$

if $\|x\| \leq w$, where $k = \int_{\{\|x\| < w\}} (w^2 - \|x\|^2)^3 dx$.

4. The method of claim 1, wherein function $f^*$ is defined over a mesh fitting the reference surface and having faces, $f^*$ being affine over each face of the mesh, the contours of the ply map being formed by respective connected edges of the mesh, the respective edges being mapped in bijection by $f^*$ onto the ply boundaries.

5. The method of claim 4, wherein other respective connected edges of the mesh are mapped in bijection by $f^*$ onto the boundary lines of the constant offset surfaces.

6. The method of claim 4, wherein other respective connected edges of the mesh are mapped in bijection by $f^*$ onto junction lines, a junction line joining the respective boundary lines of two consecutive constant offset surfaces.

7. The method of claim 4, wherein function $f^*$ corresponds to a minimum of an energy that penalizes the image of $f^*$ over each face of the mesh deviating from a constant value.

8. A non-transitory computer readable storage medium having recorded thereon a computer program comprising instructions for performing a method for designing an outer surface of a composite part manufactured by molding a stack of material layers, each material layer having a respective thickness and a respective ply boundary, the method comprising:

obtaining a reference surface and a ply map that represents the stack of material layers between the reference surface and the outer surface, the ply map being defined as a list of contours defined on the reference surface, each contour being associated to the ply boundary of a respective material layer;

defining constant offset surfaces, a constant offset surface being a respective part of the outer surface which is to have a constant offset value relative to the reference surface, the constant offset value of a respective constant offset surface corresponding to the sum of the thicknesses of the material layers below the respective constant offset surface;

determining a final surface that corresponds to a tangent continuous connection of the constant offset surfaces, each constant offset surface comprising at least a respective portion which remains invariant in the final surface; and applying the determined final surface in a 3D design of the composite part to be manufactured using a mold that physically corresponds to the determined final surface, wherein each transition surface corresponds to a convolution product between a function $f^*$ defining a continuous connection of the constant offset surfaces that interpolates the ply boundaries and a convolution kernel $\phi$ defined for $x \in \mathbb{R}^3$ and of the type $\phi(x)=0$ if $\|x\|>w$, where $\|x\|$ is the Euclidean norm of x and $w>0$ is the convolution radius.

9. A system comprising a processor coupled to a memory and a graphical user interface, the memory having recorded thereon a computer program comprising instructions for causing the processor to perform a method for designing an outer surface of a composite part manufactured by molding a stack of material layers, each material layer having a respective thickness and a respective ply boundary, the processor being configured to:

obtain a reference surface and a ply map that represents the stack of material layers between the reference surface and the outer surface, the ply map being defined as a list of contours defined on the reference surface, each contour being associated to the ply boundary of a respective material layer;

define constant offset surfaces, a constant offset surface being a respective part of the outer surface which is to have a constant offset value relative to the reference surface, the constant offset value of a respective constant offset surface corresponding to the sum of the thicknesses of the material layers below the respective constant offset surface;

determine a final surface that corresponds to a tangent continuous connection of the constant offset surfaces, each constant offset surface comprising at least a respective portion which remains invariant in the final surface; and apply the determined final surface in a 3D design of the composite part to be manufactured using a mold that physically corresponds to the determined final surface, wherein each transition surface corresponds to a convolution product between a function $f^*$ defining a continuous connection of the constant offset surfaces that interpolates the ply boundaries and a convolution kernel $\phi$ defined for $x \in \mathbb{R}^3$ and of the type $\phi(x)=0$ if $\|x\|>w$, where $\|x\|$ is the Euclidean norm of x and $w>0$ is the convolution radius.

* * * * *